(12) United States Patent
Dyck et al.

(10) Patent No.: US 11,421,865 B2
(45) Date of Patent: Aug. 23, 2022

(54) MOUNTING APPARATUS FOR UNDERWATER LIGHTS

(71) Applicant: Artistic Landscaping Inc., Waterloo (CA)

(72) Inventors: Patrick C. Dyck, Waterloo (CA); Juanita M. Dyck, Waterloo (CA)

(73) Assignee: Artistic Landscaping Inc., Waterloo (CA)

( * ) Notice: Subject to any disclaimer, the term of this patent is extended or adjusted under 35 U.S.C. 154(b) by 0 days.

(21) Appl. No.: 16/893,621

(22) Filed: Jun. 5, 2020

(65) Prior Publication Data
US 2020/0386388 A1    Dec. 10, 2020

Related U.S. Application Data

(60) Provisional application No. 62/858,611, filed on Jun. 7, 2019.

(51) Int. Cl.
| | |
|---|---|
| *F21V 21/30* | (2006.01) |
| *F21S 8/00* | (2006.01) |
| *F21V 21/02* | (2006.01) |
| *F16M 13/02* | (2006.01) |
| *E04H 4/14* | (2006.01) |
| *E04H 4/12* | (2006.01) |

(Continued)

(52) U.S. Cl.
CPC ........... *F21V 21/30* (2013.01); *E04H 4/1245* (2013.01); *E04H 4/148* (2013.01); *F16M 13/02* (2013.01); *F16M 13/022* (2013.01); *F21S 8/03* (2013.01); *F21S 8/036* (2013.01); *F21V 21/02* (2013.01); *F21V 21/04* (2013.01); *F21V 31/005* (2013.01); *F21W 2131/401* (2013.01)

(58) Field of Classification Search
CPC ....... E04H 4/148; F21V 31/00; F21V 31/005; F21W 2131/401; F16M 13/02
See application file for complete search history.

(56) References Cited

U.S. PATENT DOCUMENTS

| | | | | |
|---|---|---|---|---|
| 3,962,675 A | * | 6/1976 | Rowley | F21S 8/00 |
| | | | | 362/101 |
| 5,122,936 A | * | 6/1992 | Guthrie | F21V 29/56 |
| | | | | 362/101 |

(Continued)

*Primary Examiner* — William N Harris
(74) *Attorney, Agent, or Firm* — Bereskin & Parr LLP

(57) ABSTRACT

Mounting apparatus for mounting an underwater light to a surface of a pool of water, comprising a mounting plate having a plurality of spaced-apart mounting apertures each shaped to receive a mounting fastener to mount an underwater light assembly to the mounting plate, and a plurality of connector apertures each shaped to receive a connector fastener. The mounting apparatus may also comprise a C-shaped bracket having a jet aperture shaped to receive a return jet conduit therethrough, the return jet bracket configured to be secured to the mounting plate. The mounting apparatus may also comprise an expandable width wedge assembly configured to allow the mounting apparatus to be wedged in an underwater niche. The mounting apparatus may also comprise an adjustable angle base assembly to be secured to an underwater surface, the adjustable angle base assembly secured to the mounting plate and configured to angle the mounting plate at a desired angle relative to the underwater surface.

17 Claims, 11 Drawing Sheets

(51) Int. Cl.
*F21V 21/04* (2006.01)
*F21V 31/00* (2006.01)
*F21W 131/401* (2006.01)

(56) References Cited

U.S. PATENT DOCUMENTS

| | | |
|---|---|---|
| 6,184,628 B1 | 2/2001 | Ruthenberg |
| 6,315,424 B1 | 11/2001 | Hui |
| 6,936,978 B2 | 8/2005 | Morgan et al. |
| 7,410,268 B2 | 8/2008 | Koren et al. |
| 2017/0299159 A1* | 10/2017 | Mjelde ............... F21V 31/005 |
| 2018/0087741 A1* | 3/2018 | McFadyen ........... F21V 17/164 |

* cited by examiner

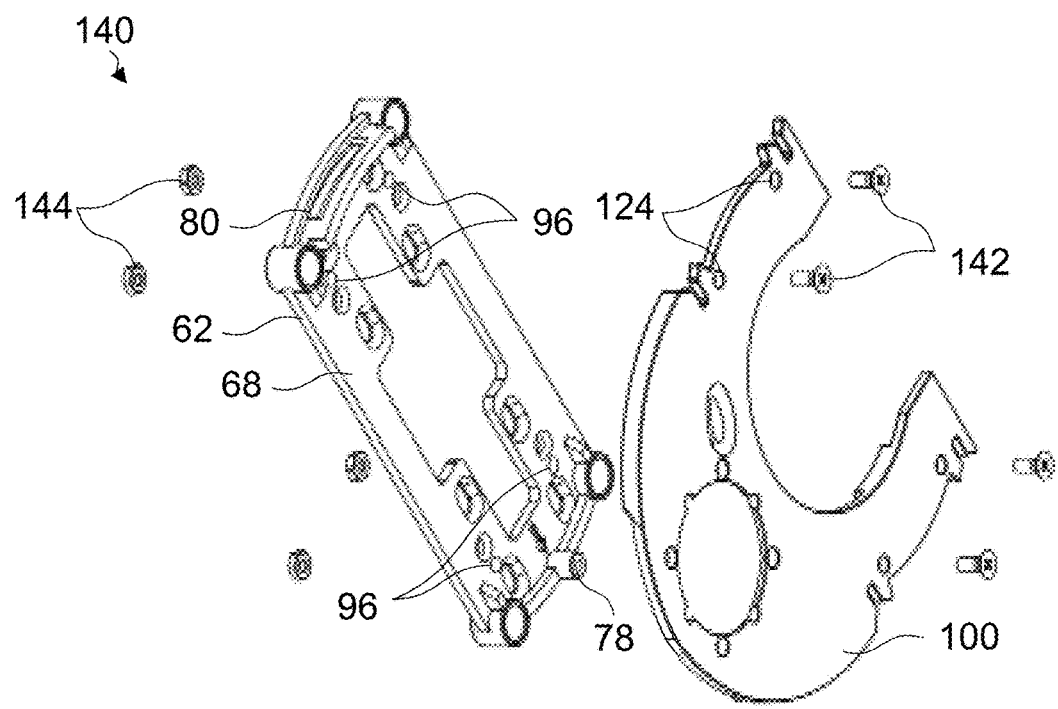
Figure 4A
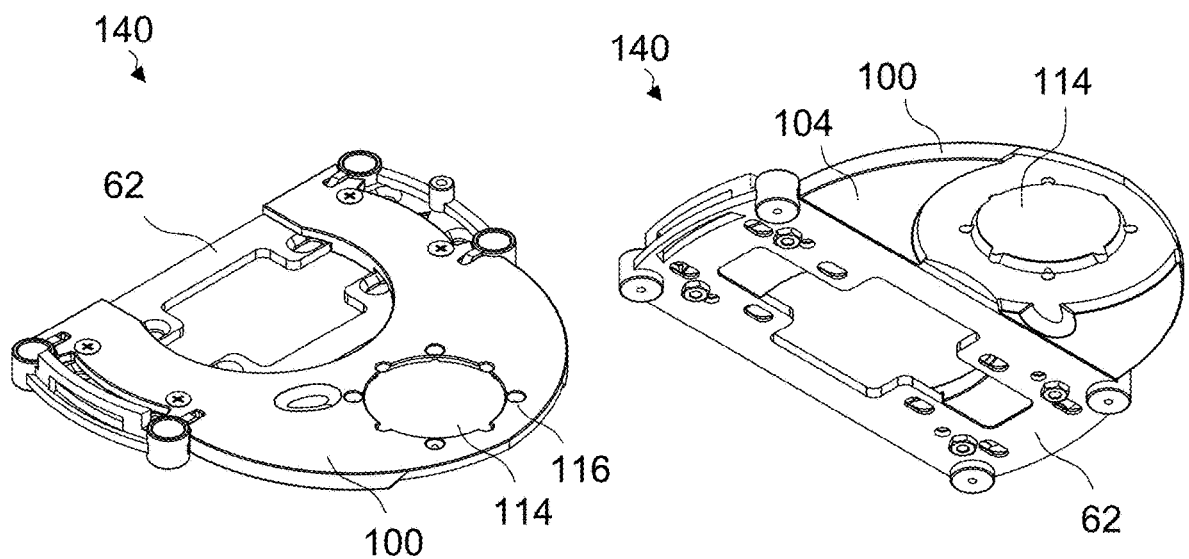
Figure 4B
Figure 4C

MOUNTING APPARATUS FOR UNDERWATER LIGHTS

CROSS-REFERENCE TO RELATED APPLICATION

This application claims the benefit of U.S. Provisional Patent Application No. 62/858,611, filed Jun. 7, 2019 and the entire content of U.S. Provisional Patent Application No. 62/858,611 is hereby incorporated by reference.

TECHNICAL FIELD

The disclosure relates to mounting apparatus, and in particular to apparatus for mounting underwater lights.

BACKGROUND

Underwater lights are used in a wide variety of applications. For example, lights are commonly placed in ponds, pools, and spas, and are often anchored to an underwater surface to provide light below a water line. Underwater lights may be used, for example, for aesthetic or safety reasons.

An example of an underwater light is disclosed in US Patent Application Publication 2018/0238533 filed by the present Applicant. The underwater light includes at least one light source for providing light, a controller electrically connected to the at least one light source, the controller being configured to control the at least one light source, a housing for providing a watertight seal to enclose the at least one light source and the controller, the housing being attachable to the mounting plate, and a signal wire for receiving remote control signals, the signal wire being electrically connected to the controller and configured to extend from the controller to an area outside of the body of water. Also disclosed is a mounting apparatus for attaching the light to an underwater surface of a pool of water, including an adapter ring and a mounting plate.

The aforementioned mounting apparatus can be used to mount an underwater light to various underwater surfaces including some underwater niches. However, there remains a need for a more versatile mounting apparatus, which can be used to mount underwater lights to a wide variety of surfaces.

SUMMARY

In a first aspect, some embodiments of the invention provide a mounting apparatus, comprising a mounting plate having a central aperture shaped to receive a cable therethrough to power a light source of an underwater light assembly, a plurality of spaced-apart mounting apertures formed in a mounting surface of the light mounting plate and spaced and configured to receive a corresponding plurality of mounting fasteners to mount an underwater light assembly to the light mounting plate, and a plurality of spaced-apart attachment apertures formed in an attachment surface of the light mounting plate and spaced and configured to receive a corresponding plurality of attachment fasteners to attach the light mounting plate to an underwater surface.

In some embodiments, the plurality of mounting fasteners including an elongated tab and a threaded fastener, and the plurality of mounting apertures includes an elongated slot shaped to receive the tab and an opening shaped to receive the threaded fastener.

The plurality of attachment apertures may include a plurality of wall-mounting apertures configured for attaching the light mounting plate directly to an underwater surface and an plurality of connector apertures configured for connecting the light mounting plate to an intermediate mounting assembly.

Each of the wall-mounting apertures may include a grommet for providing a seal.

The plurality of connector apertures may include a plurality of sets of expansion apertures, each set of expansion apertures arranged along an expansion path.

The mounting plate may have a longitudinal axis and each expansion path paralleling the longitudinal axis.

In a second aspect, some embodiments of the invention provide a return jet mounting apparatus, comprising a mounting plate having a plurality of spaced-apart mounting apertures each shaped to receive a mounting fastener to mount an underwater light assembly to the mounting plate; and a C-shaped bracket having a jet aperture shaped to receive therethrough a conduit of a jet return assembly of a pool of water, and at least one fixing aperture adjacent the jet aperture and shaped to receive a fixing fastener therein to fix the return jet bracket to the jet return assembly; and a plurality of connector fasteners, the return jet bracket and the mounting plate each having a connector surface and a plurality of spaced-apart connector apertures formed therein, each connector aperture of each plurality of connector apertures positioned to align with a connector aperture of the other plurality of connector apertures when the connector surfaces are brought into engagement with one another, the plurality of connector fasteners provided to be received in the aligned connector apertures to secure the mounting plate to the return jet bracket.

In some embodiments, the plurality of spaced-apart mounting apertures includes a mounting slot shaped to receive a tab of the underwater light assembly.

The plurality of connector apertures of the C-shaped bracket may be positioned to hold the mounting plate to one side of the jet aperture.

The at least one fixing aperture may be a plurality of spaced-apart fixing apertures.

In a third aspect, some embodiments of the invention provide a wedge mounting apparatus, comprising a mounting plate having a plurality of spaced-apart mounting apertures formed in a mounting surface of the mounting plate and each shaped to receive a mounting fastener to mount an underwater light assembly to the mounting plate, and at least two spaced-apart sets of spaced-apart mount connector apertures formed in an mount connector surface thereof, the mount connector apertures of each set of mount connector apertures arranged along an expansion path; an expandable width wedge assembly, including a spacer plate having a base connector surface and an opposite base attachment surface, the spacer plate including at least two spaced-apart sets of spaced-apart base connector apertures formed in a base connector surface thereof, each base connector aperture of the at least two sets of base connector apertures positioned to align with a mount connector aperture when the mount connector surface and the base connector surface are brought into engagement, and at least two slotted L-shaped brackets, each having an attachment plate having an L-bracket connector surface and an opposite attachment surface, the attachment plate having at least one elongated connector slot formed in the L-bracket connector surface shaped to receive at least two spaced-apart fasteners, the at least one elongated connector slot positioned to align with each base connector aperture of one spaced-apart set of base connector apertures of the at least two sets of spaced-apart base connector apertures when the L-bracket connector surface and the base attachment surface are brought into engagement, and a leg projection extending out of the attachment plate from the attachment surface and shaped to engage a sidewall of the underwater niche; and at least two sets of connector fasteners, each set including a fastener to be received through each aligned pair of mount connector aperture and base connector aperture and to be received in an aligned elongated slot of a slotted L-shaped bracket of the at least two slotted L-shaped brackets to secure the spacer plate to the mounting plate and slidably secure the slotted L-shaped bracket to the spacer plate.

In some embodiments, the plurality of spaced-apart mounting apertures includes a mounting slot shaped to receive a tab of the underwater light assembly.

Each leg projection may include at least one removable boot attachment shaped to engage a sidewall of the underwater niche.

In a fourth aspect, some embodiments of the invention provide an adjustable angle mounting apparatus, comprising a mounting plate having a plurality of spaced-apart mounting apertures each shaped to receive a mounting fastener to mount an underwater light assembly to the mounting plate, and a plurality of spaced-apart mount connector apertures each shaped to receive a connector fastener; an adjustable angle base assembly, including a spacer plate having a plurality of base connector apertures configured to align with the plurality of mount connector apertures and each shaped to receive a connector fastener, an upper slotted L-shaped bracket having an upper attachment plate with a pair of parallel and abreast elongated upper connection slots formed therethrough, and an upper leg projection extending from the attachment plate, and the upper leg projection having a plurality of upper connector apertures formed therethrough and configured to align with the base connector apertures, the upper connector apertures each shaped to receive a connector fastener, a lower slotted L-shaped bracket having a lower attachment plate with a pair of parallel and abreast elongated lower connection slots formed therethrough, and a lower leg projection extending from the attachment plate, and the lower connection slots configured to each align with a upper connection slot when the upper and lower attachment plates are brought into an engagement, to receive a repositionable connection fastener through each aligned set of connection slots to be repositioned within each slot of the aligned set of connection slots and fixed in place to hold the upper and lower slotted L-shaped brackets together at a desired angle, and the lower leg projection having a plurality of lower connection apertures formed therethrough each shaped to receive a connector fastener, and a base bracket including a plurality of spaced-apart base connector apertures therethrough and a plurality of spaced-apart attachment apertures therethrough; a pair of angle connection fasteners to be received in the upper and lower connection slots to hold the upper and lower L-shaped brackets together; a plurality of mount connection fasteners to be received through and hold together the mounting plate, the spacer plate, and the leg projection of the upper L-shaped bracket; and a plurality of base connection fasteners to be receive through and hold together the leg projection of the lower L-shaped bracket and the base bracket.

In some embodiments, the plurality of spaced-apart mounting apertures includes a mounting slot shaped to receive a tab of the underwater light assembly.

The upper slotted L-shaped bracket and the lower slotted L-shaped bracket may each be a pair of slotted L-shaped brackets configured to be arranged in parallel pairs of upper and lower slotted L-shaped brackets.

The base bracket may include a base plate and an adapter ring coupled together.

BRIEF DESCRIPTION OF THE DRAWINGS

The drawings included herewith are for illustrating various examples of systems, methods, and apparatus of the present specification. In the drawings:

FIG. 4A is a top perspective exploded view of a return jet mounting apparatus, according to another embodiment of the present disclosure;

FIG. 4B is a top perspective view of the mounting apparatus of FIG. 4A;

FIG. 4C is a bottom perspective view of the mounting apparatus of FIG. 4A;

DETAILED DESCRIPTION

Various apparatus or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Figure 1A:
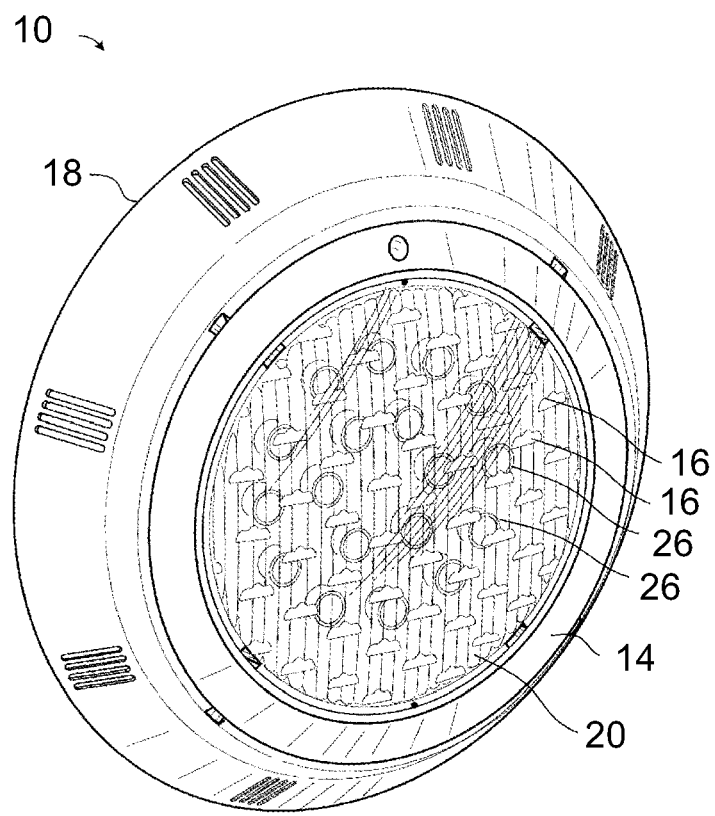
FIG. 1A is an top perspective view of an underwater light assembly.
Figure 1B:
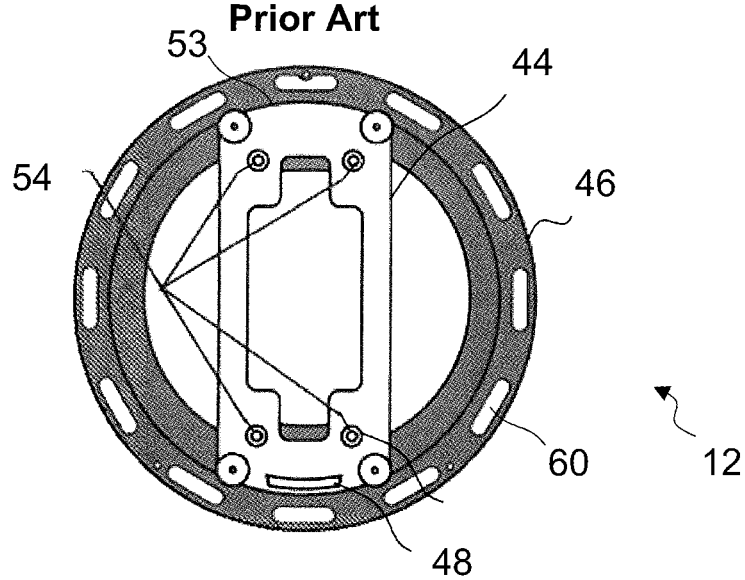
FIG. 1B is a top plan view of a mounting bracket.
Figure 1C:
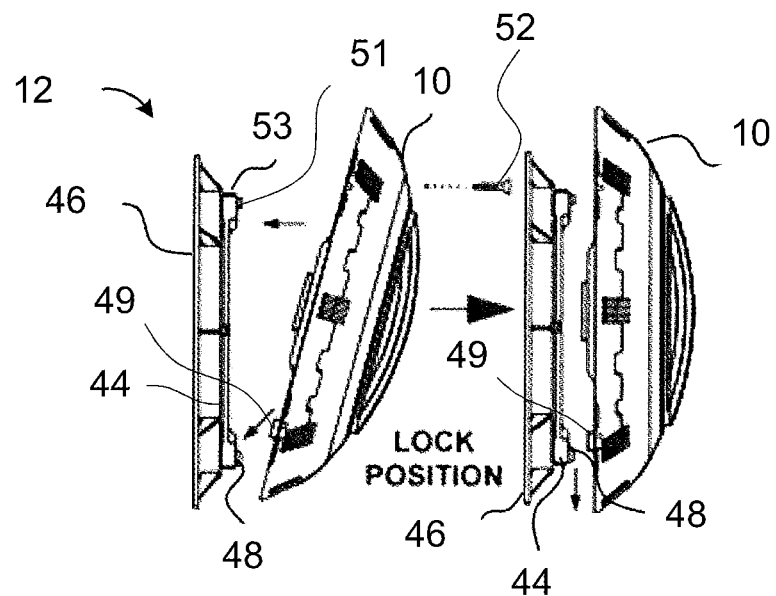
FIG. 1C is a side plan view of the underwater light assembly of FIG. 1A being mounted on the mounting bracket of FIG. 1B.

Referring to FIGS. 1A to 1C, illustrated therein is an underwater light assembly 10 and a mounting bracket 12. Underwater light assembly 10 and mounting bracket 12 are disclosed in United States Patent Application Publication No. 2018/0238533 filed by the present Applicant, which is hereby incorporated by reference in its entirety.

Underwater light assembly 10 is provided to be attached to an underwater surface of a pool of water. For example, an underwater surface may be a wall or floor of a lake, pond, concrete pool, fiberglass pool, vinyl pool liner, plastic spa, etc. The pool of water may contain or be provided to contain saltwater, freshwater, chlorinated water, and the like.

It is to be understood that an underwater surface is a surface of a pool of water that is to be underwater when the pool of water is filled with water. In some circumstances an underwater surface is not covered by water. For example, an underwater light assembly may be mounted to an underwater surface of a pool, such as a sidewall or floor, when the pool has been drained to allow for easier access.

Underwater light assembly 10 includes a face cover 14 holding a lens 20. A plurality of light refracting prisms 16 are included in lens 20. Light assembly 10 includes a plurality of light sources 26, such as light emitting diodes.

Mounting apparatus 12 includes a mounting plate 44 and an adapter ring 46. Mounting plate 44 includes a slot 48 adjacent a bottom edge 50 and shaped to receive a tab 49 secured to the underwater light assembly 10. Mounting plate 44 also includes a bore 51 adjacent a top edge 53 shaped to receive a threaded fastener 52 when fastener 52 is received in an aperture in the underwater light assembly 10.

Figure 1D:
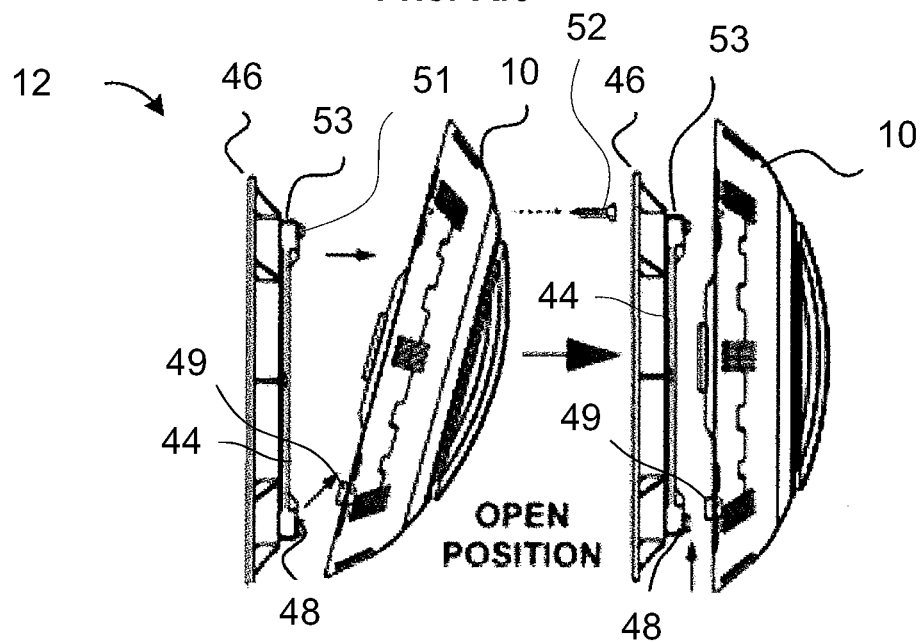
FIG. 1D is a side plan view of the underwater light assembly of FIG. 1A being removed from the mounting bracket of FIG. 1B.
Figure 2A:
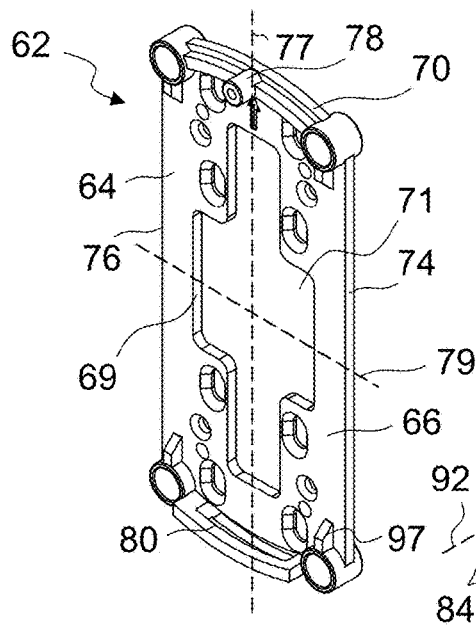
FIG. 2A is a top perspective view of a mounting plate, according to an embodiment of the present disclosure.
Figure 2B:
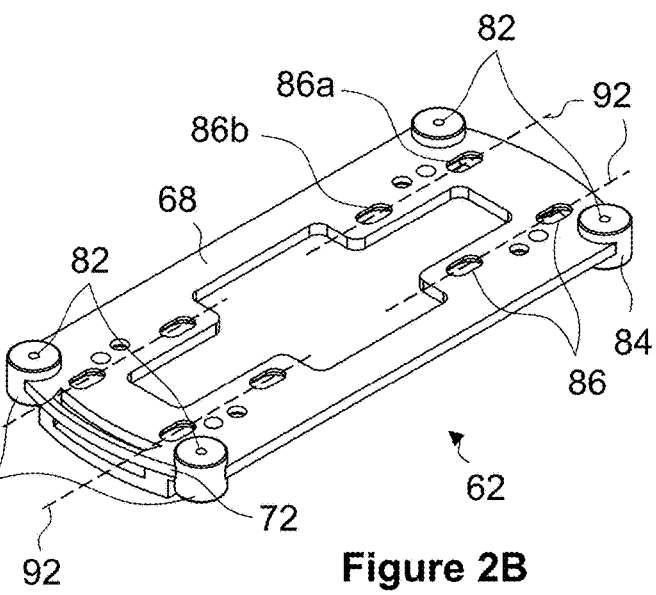
FIG. 2B is a bottom perspective view of the mounting plate of FIG. 2A.
Figure 2C:
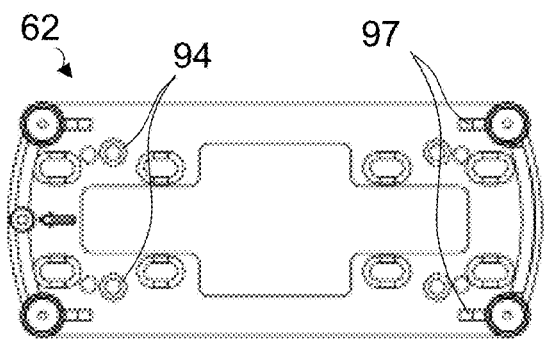
FIG. 2C is a top plan view of the mounting plate of FIG. 2A.
Figure 2D:
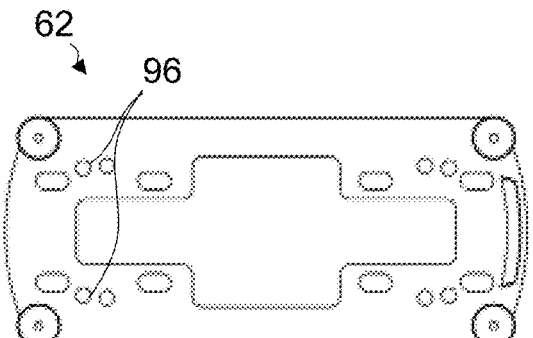
FIG. 2D is a bottom plan view of the mounting plate of FIG. 2A.
Figure 2E:
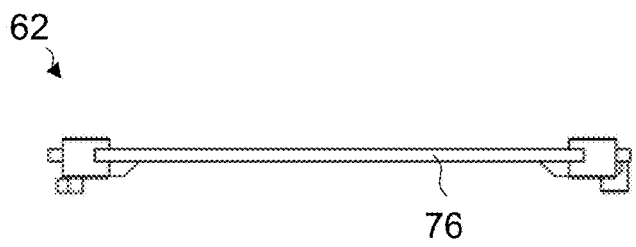
FIG. 2E is a right side elevation view of the mounting plate of FIG. 2A.
Figure 2F:
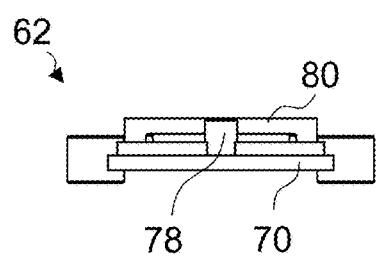
FIG. 2F is an end elevation view of the mounting plate of FIG. 2A.
Figure 3A:
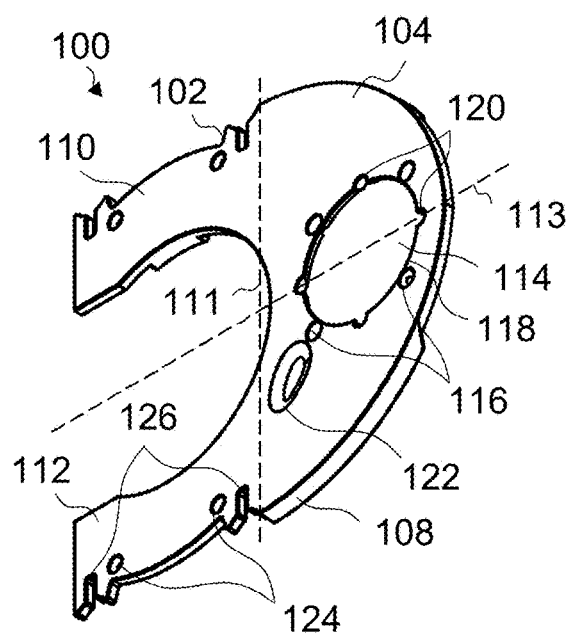
FIG. 3A is a top perspective view of a return jet bracket, according to another embodiment of the present disclosure.
Figure 3B:
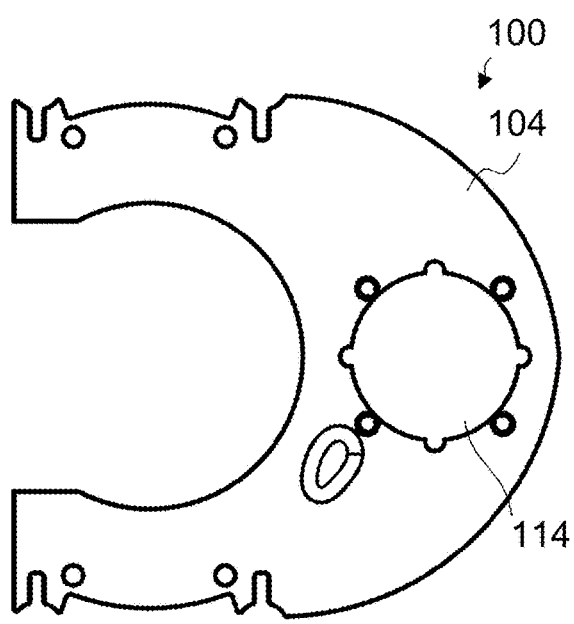
FIG. 3B is a top plan view of the return jet bracket of FIG. 3A.
Figure 3C:
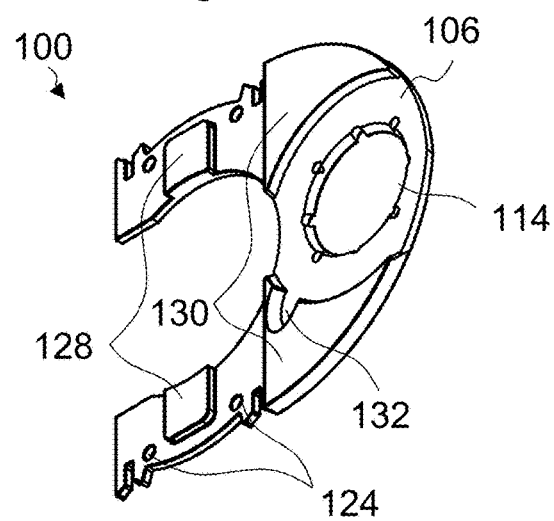
FIG. 3C is a bottom perspective view of the return jet bracket of FIG. 3A.
Figure 3D:
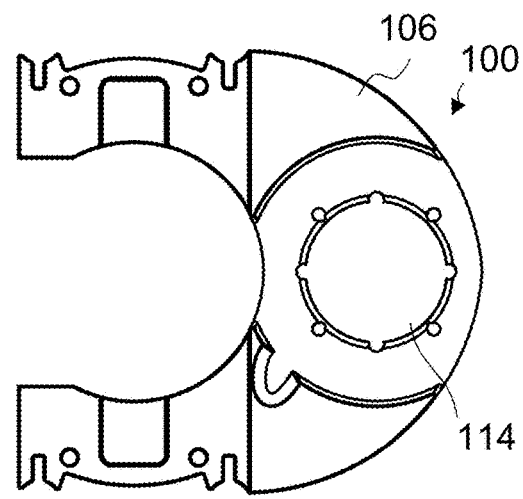
FIG. 3D is a bottom plan view of the return jet bracket of FIG. 3A.
Figure 3E:
FIG. 3E is a side elevation view of the return jet bracket of FIG. 3A.

Referring to FIGS. 1C and 1D, underwater light assembly 10 may be mounted to mounting plate 44 by inserting the tab 49 of the underwater light assembly 10 into slot 48 and then inserting fastener 52 through the apertures in both the underwater light assembly 10 and the mounting plate 44. Fastener 52 is held in place by a friction fit in bore 51 of mounting plate 44. Similarly, underwater light assembly 10 may be removed by unthreading fastener 52 and removing fastener 52 from bore 51 of mounting plate 44 and then lifting tab 49 of underwater light assembly 10 out of slot 48 of mounting plate 44.

Mounting plate 44 may be secured to adapter ring 46 by way of connector fasteners 54. Mounting plate 44 includes a plurality of connector apertures 56 forming an aperture pattern, and adapter ring 46 includes a plurality of connector apertures (not shown) forming the same aperture pattern. Mounting plate 44 and adapter ring 46 may be secured together by passing a connector fastener 54 through each matching pair of connector apertures 58 and connector apertures 58 and securing fasteners 54 in place using nuts (not shown). Adapter ring 46 may be secured to a pool niche by way of fasteners through base apertures 60.

Referring to FIGS. 2A to 2F, illustrated therein is an exemplary light mounting plate 62 for mounting an underwater light to an underwater surface of a pool of water, made in accordance with the present disclosure. Mounting plate 62 is like mounting plate 44 but more is more versatile. Mounting plate 62 includes more apertures and aperture arrangements than mounting plate 44.

Mounting plate 62 includes a planar main body member 64 having a top mounting surface 66 and a bottom connector surface 68. Mounting plate 62 is a substantially rectangular plate and has an upper edge 70, a lower edge 72, a right side edge 74, and a left side edge 76. Mounting plate 62 also includes an inner sidewall 69 bounding a central cutout 71. Mounting plate 62 defines a longitudinal axis 77 and a transverse axis 79.

Mounting plate 62 includes a plurality of spaced-apart mounting apertures formed therein to receive mounting fasteners to mount an underwater light to mounting plate 62. The mounting apertures of mounting plate 62 are a bore 78 adjacent a top edge 70 and a slot 80 adjacent a bottom edge 72. Bore 78 is formed in a raised boss and is shaped to receive and hold a threaded fastener. Slot 80 is a transverse slot formed in a raised structure and shaped to receive a tab of an underwater light assembly. In other embodiments, other arrangements, types, and quantities of mounting apertures may be included.

Mounting plate 62 includes a set of spaced-apart wall-mounting apertures 82 for attaching directly to an underwater surface of a pool of water. A set of four wall-mounting apertures 82 are formed in plate 62, and are adjacent corners of plate 62. Each of wall-mounting apertures 82 includes a grommet 84 for providing a watertight seal. Each grommet is supported by a longitudinally extending support strut 97. Wall-mounting apertures 82 may allow mounting plate 62 to be used as a stand-alone mounting apparatus.

However, mounting plate 62 may also be used as a component of a larger mounting apparatus. To this end, mounting plate 62 includes a plurality of spaced-apart connector apertures. Mounting plate 62 includes several types of connector apertures to allow use as part of various mounting apparatus. Again, it is to be understood that in other embodiments, other arrangements, types, and quantities of connector apertures may be included.

Mounting plate 62 includes four pairs of connector apertures 86, each pair adjacent a corner of mounting plate 64. Each pair 86 includes an outer aperture 86a adjacent one of the top and bottom edges 70 and 72 and an inner aperture 86b spaced from the outer aperture 86a away from the one of the top and bottom edges 70 and 72 which the outer aperture 86a is adjacent. Each connector aperture pair 86 defines an expansion path 92 parallel to longitudinal axis 77.

An expansion path 92 is a path along which a slotted member can be moved when the slotted member is slidably secured to the mounting plate 64 by way of a pair of fasters each received through one aperture of aperture pair 86 and both received in a slot in the slotted member, as will be described further below.

Mounting plate 62 also includes four auxiliary connector apertures 94 and four auxiliary connector apertures 96 to provide further connection options. Auxiliary connector apertures 94 are a set of four apertures, one adjacent each corner of mounting plate 62. Similarly, auxiliary connector apertures 96 are a set of four apertures, one adjacent each corner of mounting plate 62.

Figure 4D:
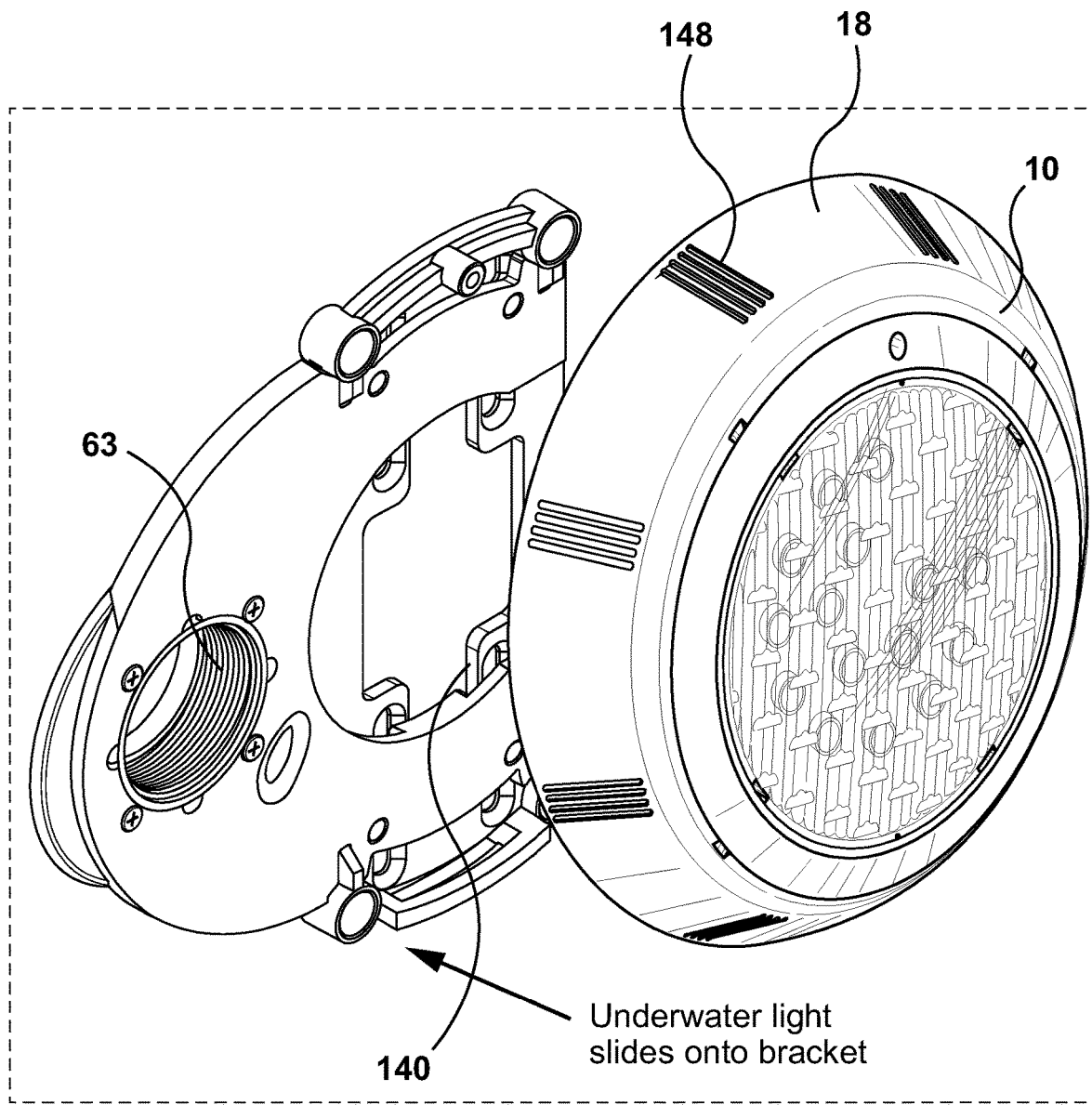
FIG. 4D is a top perspective view of the mounting apparatus of FIG. 4A attached to a jet return assembly and with an underwater light assembly adjacent the mounting apparatus.

Referring now to FIGS. 3A to 3E, illustrated therein is an exemplary C-bracket 100, made in accordance with the present disclosure. C-bracket 100 is for connecting a mounting plate, such as mounting plate 62, to a return jet assembly, such as a return jet conduit of jet return assembly 63 (FIG. 4D) of a pool or spa. C-bracket 100 has a main body member 102 having a top connector surface 104 and a bottom attaching surface 106. Main body member 102 has an outer periphery 108. Main body member 102 is a C-shaped body member which includes a pair of support legs 110 and 112 projecting to one side of a jet aperture 114.

Jet aperture 114 is shaped to receive a conduit, such as a return jet conduit of a return jet assembly, therethrough. Adjacent jet aperture 114 is are a plurality of fixing apertures 116 each shaped to receive a fixing fastener therethrough, the fixing fastener to be received by a portion of the jet return assembly to fix the C-bracket 100 to the jet return assembly.

The perimeter wall 118 of jet aperture 114 also includes a plurality of indents 120. Indents 120 are shaped and configured to overlay a fitting of a return jet assembly. Holding plate 100 also has an indent 122 in top connector surface 104 to provide space for a wire.

C-bracket 100 has a plurality of connector apertures 124 formed therethrough on support legs 110 and 112, positioned to hold the mounting plate to one side of the jet aperture 114. C-bracket 100 also has a plurality of indents 126 in periphery 108 shaped to receive structure of a plate brought into engagement with C-bracket 100.

Protrusions 128 project from bottom attaching surface 106 on support legs 110 and 112 and are shaped and configured to be received in central cutout 71 of mounting plate 62. Protrusions 130 project from bottom attaching surface 106 adjacent jet aperture 114 and reinforce curving portions of the bracket. An indent 132 is formed in one of protrusions 130 in a side facing jet aperture 114 to provide space for a wire.

Referring now to FIGS. 4A to 4D, illustrated therein is an exemplary return jet mounting apparatus 140 made in accordance with the present disclosure. Return jet mounting apparatus 140 includes light mounting plate 62 and C-bracket 100.

Return jet mounting apparatus 140 includes provision for an underwater light assembly to be mounted to mounting plate 62. As described above, mounting plate 62 includes apertures 78 and 80 to receive mounting fasteners.

Return jet mounting apparatus 140 includes provision for mounting plate 62 to be connected to C-bracket 100. Auxiliary connector apertures 96 of mounting plate 62 and connector apertures 124 of C-bracket 100 are positioned to be aligned when top connector surface 104 of C-bracket 100 and bottom connector surface 68 of mounting plate 62 are brought into engagement. Indents 126 are provided to receive support struts 97 of mounting plate 62. Connector fasteners 142 are provided to be passed through auxiliary connector apertures 96 and connector apertures 124. Connector fasters 142 are machine screws, and each connector fastener 142 includes a nut 144 to be threaded onto the machine screw to secure the machine screw.

Mounting apparatus 140 also includes provision for attaching to an underwater surface. As discussed above, C-bracket 100 includes a jet aperture 114 and fixing apertures 116 for use in securing C-bracket 100 to a return jet assembly.

A jet of water coming from the return jet conduit to which return jet mounting assembly 140 is mounted may be accommodated in a variety of ways. For example, legs 110 and 112 may be lengthened so that the underwater light assembly is not overlaying the return jet conduit. However, is may be desired that the underwater light assembly does overlay the return jet conduit. In some embodiments, the water jet may be directed through vents in a housing of an underwater light assembly. For example, referring to FIG. 4D, a water jet may be directed through vents 148 in housing cover 18 of the underwater light assembly 10.

Referring now to FIGS. 5A to 5K, illustrated therein is an exemplary wedge mounting apparatus 150 made in accordance with the present disclosure. Mounting apparatus 150 includes mounting plate 62 to which an underwater light assembly may be mounted. As described below, wedge mounting apparatus 150 may be adjusted between retracted and expanded positions to allow wedge mounting apparatus 150 to be expanded into a position allowing it to be wedged into an underwater niche or other underwater space.

Mounting apparatus 150 includes a spacer plate 152, a first slotted L-shaped member 170, and a second slotted L-shaped member 172, provided for attaching the mounting apparatus to an underwater surface by wedging mounting apparatus 150 in an underwater niche.

Spacer plate 152 is a substantially rectangular planar plate sized and shaped to fit over mounting plate 64, including corner cutouts to accommodate grommets 84. Spacer plate 152 includes a top connector surface (not shown) a bottom connector surface 154, a upper edge 156, a lower edge 158, a right side edge 160, and a left side edge 162. Spacer plate 152 also includes a plurality of connector aperture pairs 164 positioned to correspond to aperture pairs 86 of mounting plate 62. Aperture pairs 164 include a first aperture 166 adjacent one of the upper or lower edges 156 and 158 and a second aperture 168 spaced apart from the first aperture 166 away from the one of the upper and lower edges 156 and 158 which the first aperture 166 is adjacent. Apertures 166 and 168 are longitudinally smaller than apertures 86a and 86b to further restrict the movement of fasteners received in apertures 156 and 158.

The apertures of aperture pairs 164 of spacer plate 152 are longitudinally smaller than the apertures of apertures pairs 86 of mounting plate 62. This permits limited adjusting of mounting plate 62 relative to a spacer plate 152, such as to accommodate a niche that was mounted out of flush to a wall of a pool of water. The addition of a spacer plate also serves to support a fastener received therethrough to assist in directing the fastener.

First and second slotted L-shaped members 170 and 172 define a longitudinal axis 167 and a transverse axis 169. First and second slotted L-shaped members 170 and 172 each have an attachment plate 174 and 176, respectively. Each attachment plate 174 and 176 has a top connector surface, 171 and 173 respectively, and a bottom attaching surface, 175 and 177 respectively. Each slotted L-shaped member 170 and 172 also has a leg, 178 and 180 respectively. Legs 178 and 180 project at a 90° angle from attachment plates 174 and 176, respectively. In mounting apparatus 150, leg 178 and attachment plate 174 are integrally formed of a single plate with leg 178 bent out of the plane of attachment plate 174 along a linear bending allowance. Leg 178 is a planar leg and a plane of leg 178 forms a 90° angle with a plane of attachment plate 174. Similarly, leg 180 and attachment plate 176 are formed of a single plate with leg 180 bent out of the plane of attachment plate 176 along a linear bending allowance. Leg 180 is a planar leg and a plane of leg 180 forms an oblique angle with a plane of attachment plate 176.

In each attachment plate 174 and 176 are formed a pair of two elongated, longitudinal connection slots, each shaped to receive at least two spaced-apart fasteners. Slots 182 and 184 are formed in attachment plate 174, and slots 186 and 188 are formed in attachment plate 176. The slots of each pair are parallel, of approximately equal length, and are positioned side-by-side. Each slot includes an outer end 190 nearest the leg and an inner end 192 farthest from the leg.

Figure 5A:
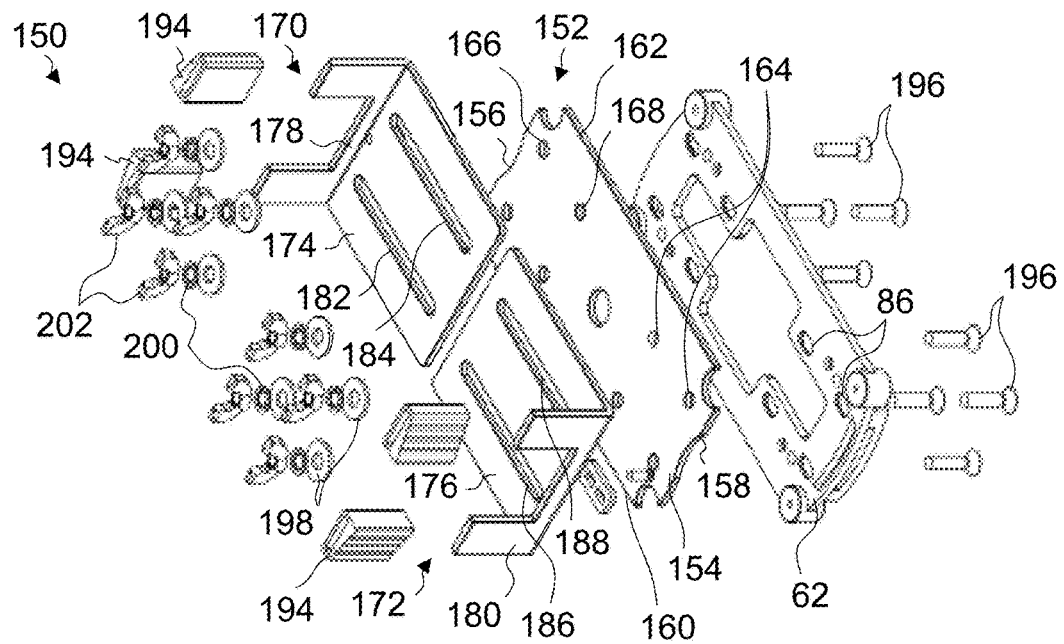
FIG. 5A is a bottom perspective exploded view of a wedge mounting apparatus, according to another embodiment of the present disclosure.
Figure 5B:
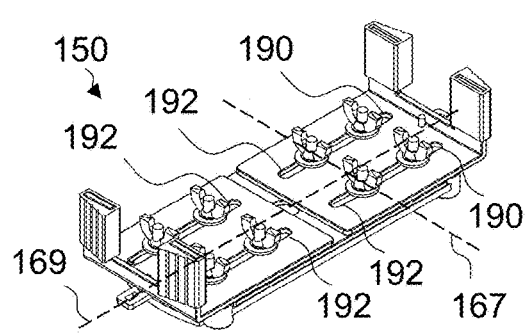
FIG. 5B is a bottom perspective view of the mounting apparatus of FIG. 5A.
Figure 5C:
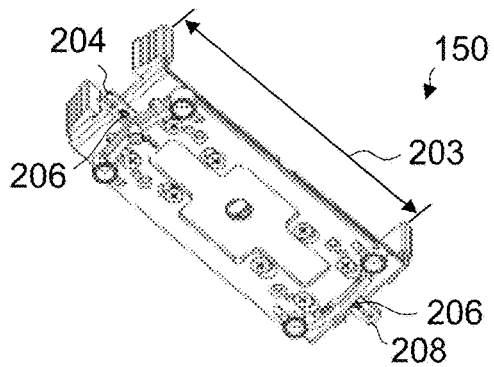
FIG. 5C is a top perspective view of the mounting apparatus of FIG. 5A.
Figure 5D:
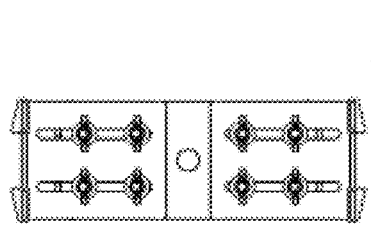
FIG. 5D is a bottom plan view of the mounting apparatus of FIG. 5A.
Figure 5E:
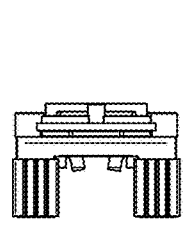
FIG. 5E is an end elevation view of the mounting apparatus of FIG. 5A.
Figure 5F:
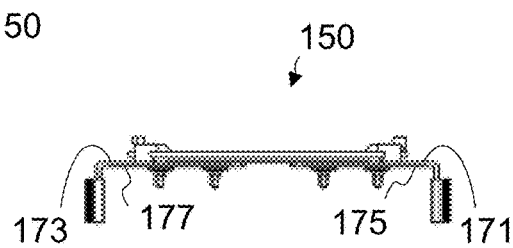
FIG. 5F is a side elevation view of the mounting apparatus of FIG. 5A.
Figure 5H:
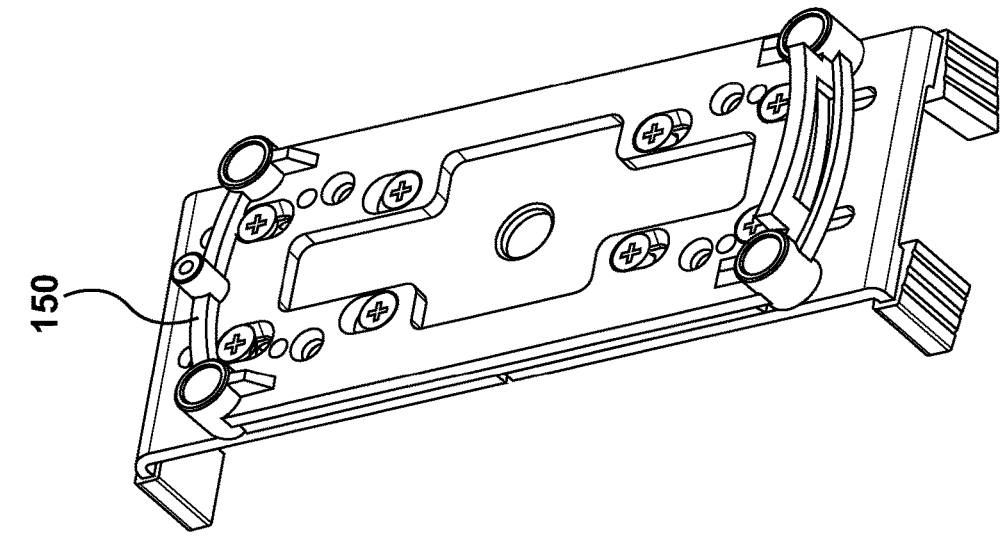
FIG. 5H is a top perspective view of the mounting apparatus of FIG. 5A.
Figure 5G:
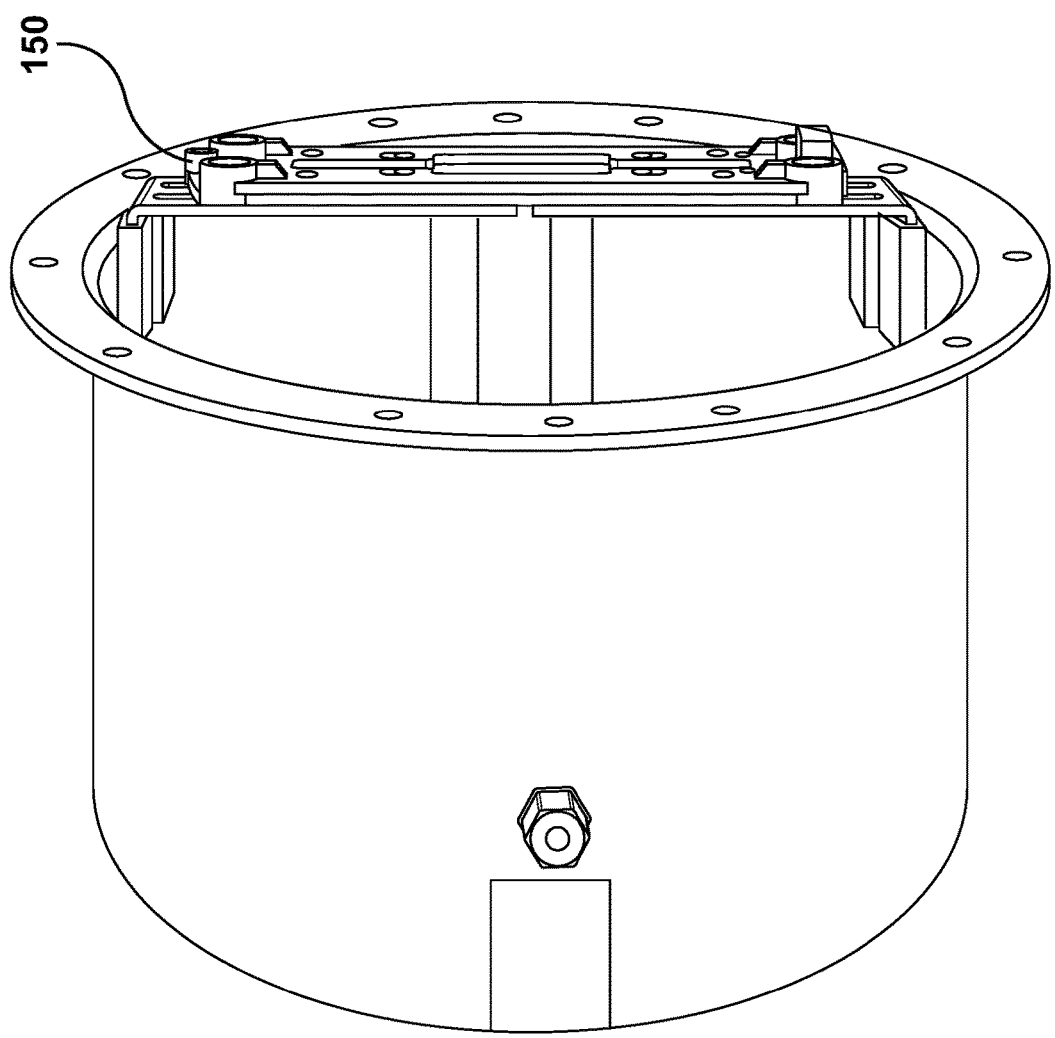
FIG. 5G is a side perspective view of the mounting apparatus of FIG. 5A wedged in a niche.

Each of legs 178 and 180 branches into two feet. Mounting apparatus 150 also includes a set of four removable boot attachments 194, one for each foot, shaped to engage a sidewall of an underwater niche. Boot attachments 194 are made of a high-friction material to better grip the sidewall of the underwater niche. As described herein, Wedge mounting apparatus 150 can be expanded to engage boot attachments 194 with sidewalls of an underwater niche to wedge the wedge mounting apparatus 150 in the underwater niche as shown in FIG. 5G.

Mounting apparatus 150 also includes a set of connector fasteners 196. Connector fasteners 196 include machine screws. Each connector fastener also includes a flat washer 198, an internal tooth lock washer 200, and a wingnut 202 for use in holding the connector fastener 196 in position when tightened.

Mounting apparatus 150 includes provision for mounting plate 62 to be connected to first and second slotted L-shaped members 170 and 172. Connector apertures 86a and 86b of connector aperture pairs 86 of mounting plate 62 and connector apertures 166 and 168 of connector aperture pairs 164 of spacer plate 152 are positioned to be aligned when top connector surface (not shown) of spacer plate 152 and bottom connector surface 68 of mounting plate 62 are brought into engagement. Further, slots 182, 184, 186, and 188 are each positioned to be aligned with a connector aperture pair 164 of spacer plate 152 when bottom connector surface 154 of spacer plate 152 and top connector surfaces 171 and 173 are brought into engagement.

When connector fasteners 196 are passed through connector aperture pairs 86, connector aperture pairs 164, and connector slots 182, 184, 186, and 188, first and second slotted L-shaped members 170 and 172 may be translated longitudinally between fully retracted positions and fully extended positions. In fully retracted positions, the first apertures 86a and the first apertures 166 are aligned with slot outer ends 190. In fully extended positions, the second apertures 86b and the second apertures 168 are aligned with slot inner ends 192.

A user may position the first and second slotted L-shaped members at a desired position between fully retracted and fully extended positions, inclusive, and then secure the first and second slotted L-shaped members in position using the flat washer 198, internal tooth lock washer 200, and wingnut 202 of each connector fastener 196. In this way, a user may adjust the height 203 of mounting apparatus 150 to match the width of a niche in which the mounting apparatus 150 is to be mounted.

Mounting apparatus 150 also includes an first niche tab 204 to be held in place by tapping screw 206 and a second niche tab 208 to be held in place by a tapping screw 206. First niche tab 204 is to be secured to first slotted member 170 and second niche tab 208 is to be secured to second slotted member 172. Niche tabs 204 and 208 extend longitudinally out past legs 178 and 180 and to an extent greater than height 203. Niche tabs 204 and 208 are shaped to engage a lip or outer ring of an underwater niche to limit the extent to which mounting apparatus 150 can be inserted into an underwater niche. In some embodiments, niche tabs 204 and 208 each include an aperture therethrough to allow the tabs to be fastened directly to a niche instead of or in addition to other attaching structure.

The extension extent of first and second slotted members 170 and 172 may be adjusted and readjusted by loosening and re-securing connector fasteners. It is to be understood that in other embodiments other slidable members may be used in place of L-shaped members 170 and 172.

Figure 5K:
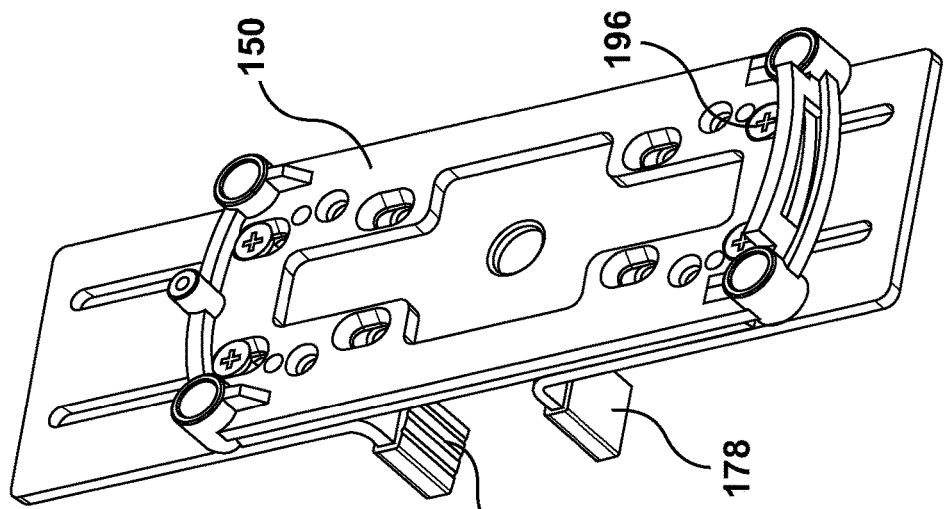
FIG. 5K is a top perspective view of the mounting apparatus of FIG. 5A with the L-shaped brackets inverted.
Figure 5J:
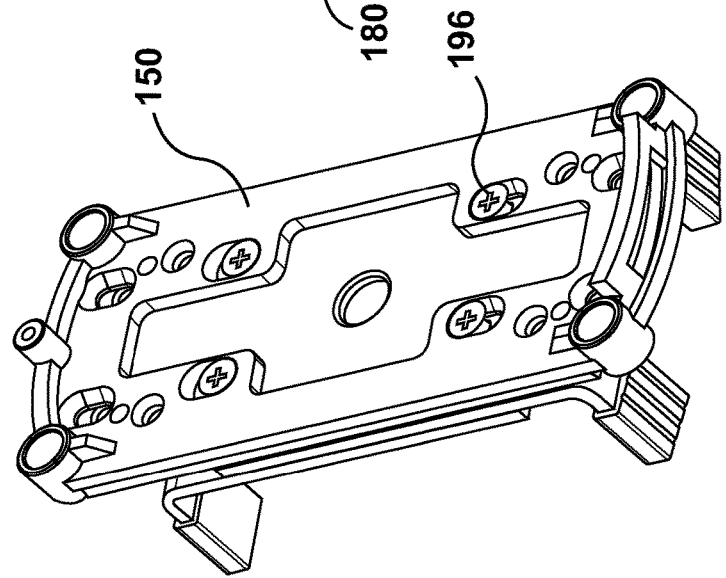
FIG. 5J is a top perspective view of the mounting apparatus of FIG. 5A with the L-shaped brackets retracted.
Figure 5I:
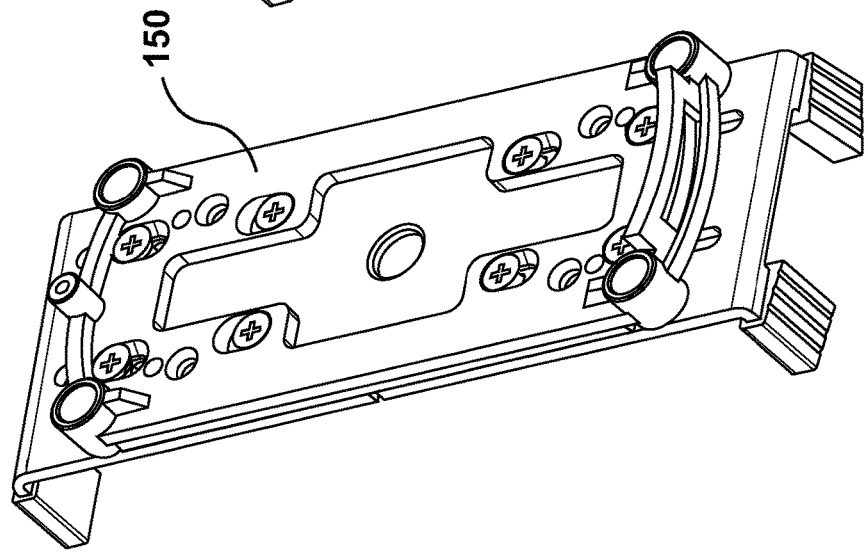
FIG. 5I is a top perspective view of the mounting apparatus of FIG. 5A with the L-shaped brackets extended.

First and second slotted members 170 and 172 are shown in FIGS. 5A to 5I with two connector fasteners 196 received in each slot. However, in some embodiments, such as shown in FIGS. 5J and 5K, wedge mounting apparatus 150 may be arranged with only one connector fastener 196 in each slot.

First and second slotted members 170 and 172 are shown in FIGS. 5A to 5J arranged with the leg projections 178 and 180 directed longitudinally outwards. However, for smaller niches or other openings it may be necessary to arrange first and second slotted members 170 and 172 with the leg projections 178 and 180 directed longitudinally inwards, such as shown in FIG. 5K. Wedge mounting apparatus 150 may then be expanded by moving attachment plates 174 and 176 longitudinally outwards as when leg projections 178 and 180 are directed outwards. For example, an inward arrangement of leg projections 178 and 180 may be necessary for a small spa niche.

Referring now to FIGS. 6A to 6D, illustrated therein is an exemplary adjustable angle mounting apparatus 210 made in accordance with the present disclosure. Adjustable angle mounting apparatus 210 may be adjusted to angle a mounted underwater light assembly attached to an underwater surface of a pool of water, to direct a light source of the underwater light assembly at a desired angle.

Mounting apparatus 210 includes a light mounting plate 62 to which an underwater light assembly may be mounted.

Mounting apparatus 210 also includes a base assembly 213. Base assembly 213 includes a spacer plate 152, two pairs of slotted members 211, and a base bracket 225. Base bracket 225 includes a base plate 214, and an adapter ring 46. Each pair of slotted members 211 includes an upper slotted member 211a and a lower slotted member 211b. Each slotted member has a longitudinal axis 221, a transverse axis 223, and a vertical axis 224, shown for example in FIG. 6C for a top slotted member 211a.

Each slotted member 211a and 211b includes an attachment plate 218 spanning longitudinal and transverse axis 221 and 223 and a leg 220 extending from the attachment plate 218 along the vertical axis 224. Each attachment plate 218 includes a pair of parallel, side-by-side slots 222 and 224 of approximately equal length. Each leg 220 includes a plurality of connector apertures 226.

Figure 6A:
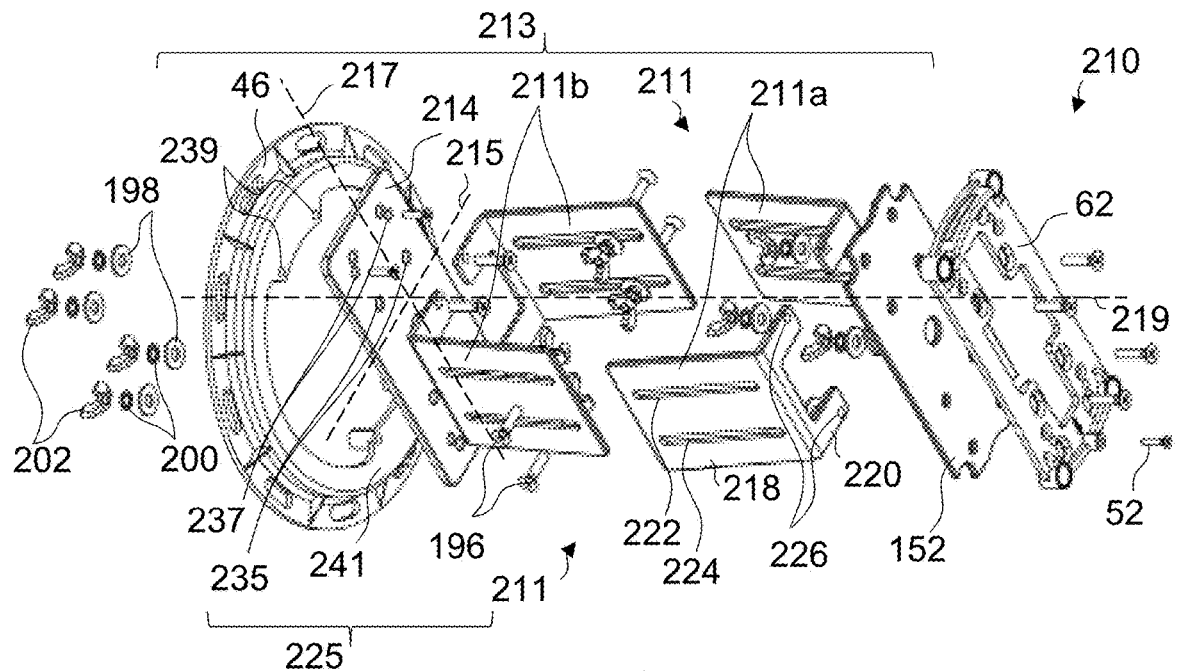
FIG. 6A is a top perspective exploded view of an adjustable angle mounting apparatus, according to another embodiment of the present disclosure.
Figure 6B:
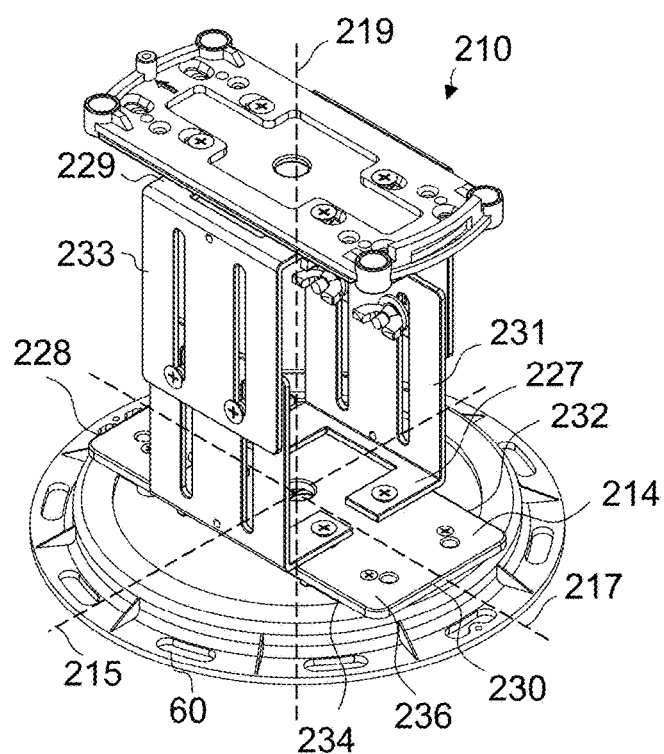
FIG. 6B is a top perspective view of the mounting apparatus of FIG. 6A.

As shown in FIG. 6B, each leg has an inner connector surface 227 facing attachment plate 218 and an opposing outer connector surface 229. Each attachment plate has an inner connector surface 231 facing leg 220 and an opposite outer connector surface 233.

Figure 6C:
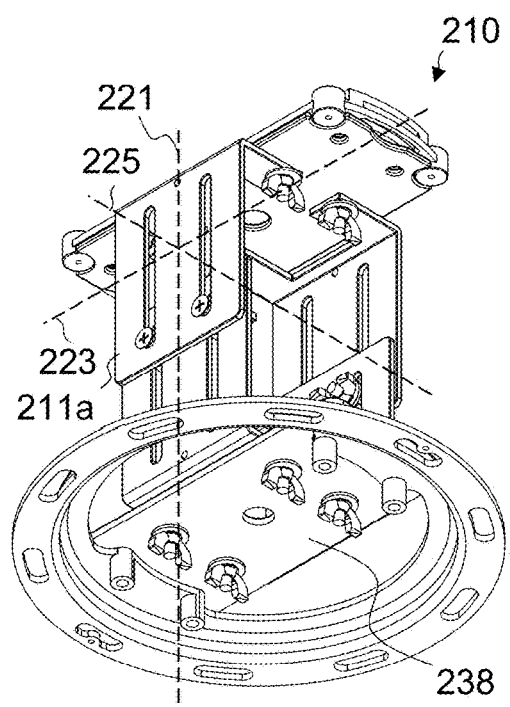
FIG. 6C is a bottom perspective view of the mounting apparatus of FIG. 6A.
Figure 6D:
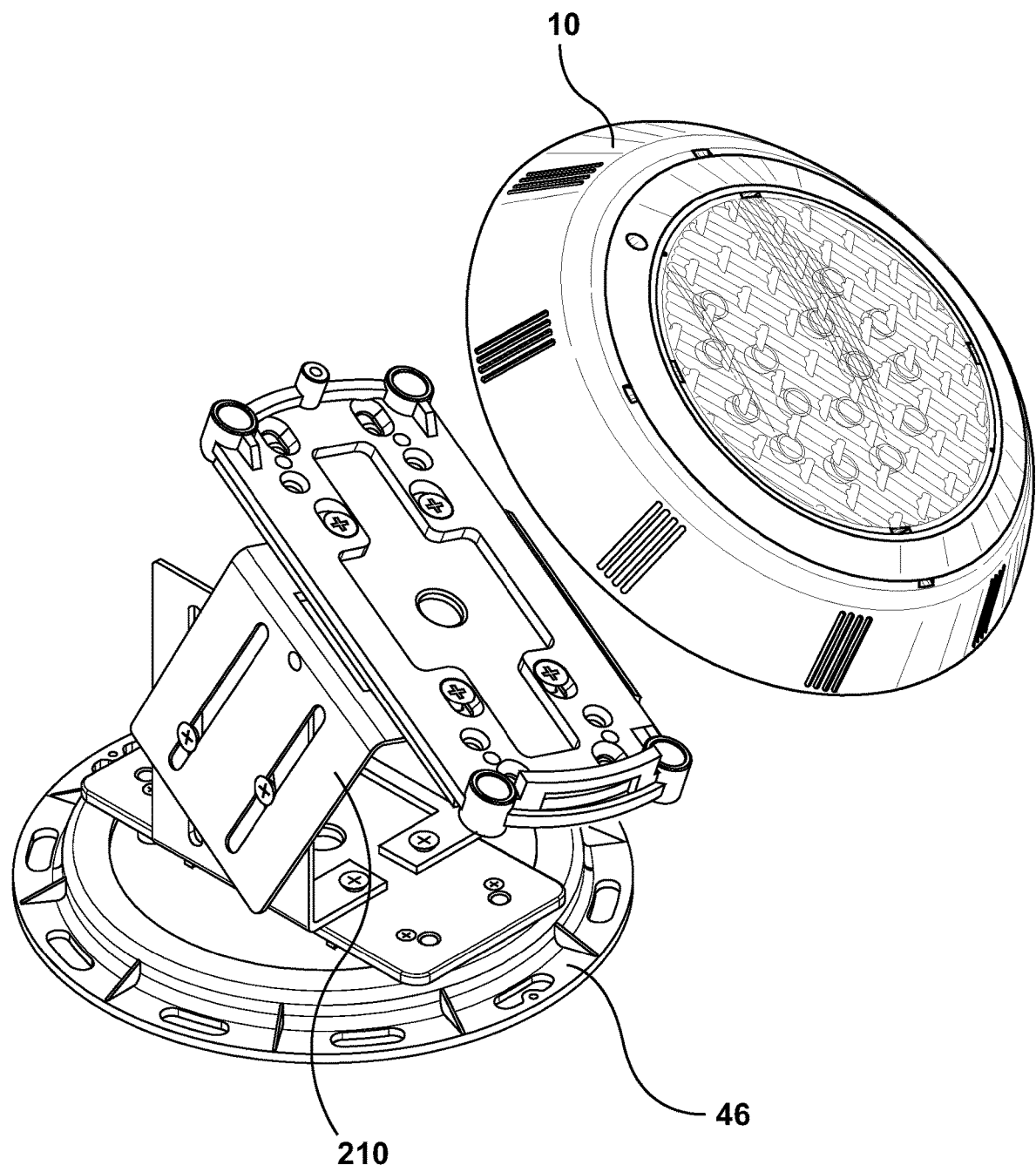
FIG. 6D is a top perspective view of the mounting apparatus of FIG. 6A with the L-shaped slotted members angled relative to one another and with an underwater light assembly adjacent the mounting apparatus.

Continuing to refer to FIG. 6B, base plate 214 is a substantially rectangular plate and has an upper edge 228, a lower edge 230, a right side edge 232, a left side edge 234, a top connector surface 236, and a bottom attaching surface 238 (FIG. 6C). Base plate 214 has a transverse axis 215, a longitudinal axis 217, and a vertical axis 219. A base plate is provided to support a fastener received therethrough to assist in directing the fastener. A base plate also allows for additional flexibility in the arrangement connecting apertures.

Mounting apparatus 210 also includes a plurality of connector fasteners 196, each connector fastener including a flat washer 198, internal tooth lock washer 200, and wingnut 202.

Mounting apparatus 210 is configured for joining the upper slotted member 211a and the lower slotted member 211b of each pair of slotted members 211, for connecting mounting plate 62 to each pair of slotted members 211, and for connecting each pair of slotted members 211 to adapter ring 46. Inner apertures 86b of connector aperture pairs 86 of mounting plate 62 and inner connector apertures 168 of connector aperture pairs 164 of spacer plate 152 are positioned to be aligned when top connector surface (not shown) of spacer plate 152 and bottom connector surface 68 of mounting plate 62 are brought into engagement. Further, connector apertures 226 of legs 220 of upper slotted members 211a are positioned to be aligned with inner connector apertures 168 of connector aperture pairs 164 of spacer plate 152 when bottom connector surface 154 of spacer plate 152 and outer connector surfaces 229 of each upper slotted member 211a are brought into engagement.

When connector fasteners 196 are passed through inner connector apertures 86b, inner connector apertures 168, and connector apertures 226 then may be secured in position using the flat washer 198, internal tooth lock washer 200, and wingnut 202 of each connector fastener.

In each pair of slotted members 211, slots 222 and 224 of upper slotted member 211a are positioned to be aligned with slots 222 and 224, respectively, of lower slotted member 211b when inner connector surface 227 of upper slotted member 211a is brought into engagement with outer connector surface 231 of lower slotted member 211b. When a connector fastener 196 is passed through slot 222 of upper member 211a and slot 224 of lower member 211b and another connector fastener 196 is passed through slot 224 of upper member 211a and slot 222 of lower member 211b, the upper and lower slotted members 211a and 211b may be longitudinally angled relative to one another by adjusting the positions of the connector fasteners 196 within the slots 222 and 224. When a desired angle has be found, connector fasteners 196 may be secured using the flat washer 198, internal tooth lock washer 200, and wingnut 202 of each connector fastener to hold the upper and lower slotted members 211a and 211b in position.

Each lower slotted member 211b also includes connector apertures 226 on leg 220. Connector apertures 226 are positioned to be aligned with inner apertures 235 of base plate 214 when a top connector surface 236 of base plate 214 and outer connector surface 229 of lower slotted members 211a are brought into engagement. Lower slotted members 211b may then be secured to base plate 214 using connector fasteners 198.

Base plate 214 also includes outer apertures 237 positioned to be aligned with connector apertures 239 of ring 46 when a bottom connector surface 236 of base plate 214 is brought into engagement with a top connector surface 241 of ring 46. The base plate 214 may then be secured in plate with connector fasteners 196.

Adapter ring 46 may then be secured to an underwater surface of a pool of water by passing attachment fasteners through base apertures 60 of ring 46. For example, adapter ring 46 may be secured to a floor of a pond or fountain to allow a mounted underwater light assembly to emit light at the desired angle.

The angle between upper and lower slotted members 211a and 211b in each pair of upper and lower slotted members may be adjusted or readjusted as desired by loosening wingnuts and moving upper slotted member 211a as desired and then retightening the wingnuts. The base assembly also allows for a limited adjustment in height, as upper and lower slotted members 211a and 211b may be raised and lowered relative to one another prior to securing connector fasteners.

The mounting apparatus of the present disclosure allows for retrofit of a wide variety of existing mounting surfaces. For example, a mounting apparatus may be used with a light emitting diode light and may be used to retrofit a mounting niche which is configured to receive a halogen underwater light.

The present invention has been described here by way of example only. Various modification and variations may be made to these exemplary embodiments without departing from the scope of the invention, which is limited only by the appended claims.

The invention claimed is:

1. A mounting apparatus, comprising:
 a mounting plate having:
  a central aperture shaped to receive a cable therethrough to power a light source of an underwater light assembly;
  a plurality of spaced-apart mounting apertures formed in a mounting surface of a main body member of the mounting plate and spaced and configured to receive a corresponding plurality of mounting fasteners to mount the underwater light assembly to the mounting plate; and
  a plurality of spaced-apart connector apertures formed in a connector surface of the main body member of the mounting plate and spaced and configured to receive a corresponding plurality of connector fasteners to attach the mounting plate to an underwater surface, and
  wherein the main body member is a single-piece body.

2. The mounting plate of claim 1, wherein the plurality of mounting fasteners includes an elongated tab and a threaded fastener, and the plurality of mounting apertures includes an elongated slot shaped to receive the tab and an opening shaped to receive the threaded fastener.

3. The mounting plate of claim 1, wherein the plurality of connector apertures includes a plurality of wall-mounting apertures configured for attaching the mounting plate directly to the underwater surface and a plurality of intermediate connector apertures configured for connecting the mounting plate to an intermediate mounting assembly, and wherein the plurality of intermediate connector apertures are separate from the plurality of wall-mounting apertures.

4. The mounting plate of claim 3, wherein each of the wall-mounting apertures includes a grommet for providing a seal.

5. The mounting plate of claim 1, wherein the plurality of connector apertures includes a plurality of sets of expansion apertures, each set of expansion apertures arranged along an expansion path.

6. The mounting plate of claim 5, wherein the mounting plate has a longitudinal axis and each expansion path parallels the longitudinal axis.

7. A return jet mounting apparatus, comprising:
   a. the mounting plate of claim 1; and
   b. a C-shaped return jet bracket having:
      i. a jet aperture shaped to receive therethrough a conduit of a jet return assembly of a pool of water, and
      ii. at least one fixing aperture adjacent the jet aperture and shaped to receive a fixing fastener therein to fix the return jet bracket to the jet return assembly; and
   c. the plurality of connector fasteners, wherein the return jet bracket has a connector surface and a plurality of spaced-apart connector apertures formed therein, each connector aperture of each plurality of connector apertures of the return jet bracket and the mounting plate positioned to align with a connector aperture of the other plurality of connector apertures when the connector surfaces are brought into engagement with one another, the plurality of connector fasteners provided to be received in the aligned connector apertures to secure the mounting plate to the return jet bracket.

8. The return jet mounting apparatus of claim 7, wherein the plurality of spaced-apart mounting apertures includes a mounting slot shaped to receive a tab of the underwater light assembly.

9. The return jet mounting apparatus of claim 7, wherein the plurality of connector apertures of the C-shaped bracket are positioned to hold the mounting plate to one side of the jet aperture.

10. The return jet mounting apparatus of claim 7, wherein the at least one fixing aperture is a plurality of spaced-apart fixing apertures.

11. A wedge mounting apparatus, comprising:
   a. the mounting plate of claim 1, wherein the plurality of spaced-apart mount connector apertures includes at least two spaced-apart sets of spaced-apart mount connector apertures formed in the mount connector surface thereof, the mount connector apertures of each set of mount connector apertures arranged along an expansion path;
   b. an expandable width wedge assembly, including:
      i. a spacer plate having a base connector surface and an opposite base attachment surface, the spacer plate including at least two spaced-apart sets of spaced-apart base connector apertures formed in a base connector surface thereof, each base connector aperture of the at least two sets of base connector apertures positioned to align with a mount connector aperture of the plurality of mount connector apertures when the mount connector surface and the base connector surface are brought into engagement, and
      ii. at least two slotted L-shaped brackets, each having:
         1. an attachment plate having an L-bracket connector surface and an opposite attachment surface, the attachment plate having at least one elongated connector slot formed in the L-bracket connector surface shaped to receive at least two spaced-apart fasteners, the at least one elongated connector slot positioned to align with each base connector aperture of one spaced-apart set of base connector apertures of the at least two sets of spaced-apart base connector apertures when the L-bracket connector surface and the base attachment surface are brought into engagement, and
         2. a leg projection extending out of the attachment plate from the attachment surface and shaped to engage a sidewall of the underwater niche; and
   c. the plurality of connector fasteners, wherein the plurality of connector fasteners includes at least two sets of connector fasteners, each set including a fastener to be received through each aligned pair of mount connector aperture and base connector aperture and to be received in an aligned elongated slot of a slotted L-shaped bracket of the at least two slotted L-shaped brackets to secure the spacer plate to the mounting plate and slidably secure the slotted L-shaped bracket to the spacer plate.

12. The wedge mounting apparatus of claim 11, wherein the plurality of spaced-apart mounting apertures includes a mounting slot shaped to receive a tab of the underwater light assembly.

13. The wedge mounting apparatus of claim 11, wherein each leg projection includes at least one removable boot attachment shaped to engage a sidewall of the underwater niche.

14. An adjustable angle mounting apparatus, comprising:
   a. the mounting plate of claim 1;
   b. an adjustable angle base assembly, including:
      i. a spacer plate having a plurality of base connector apertures configured to align with the plurality of mount connector apertures and each shaped to receive a connector fastener of the plurality of connector fasteners,
      ii. an upper slotted L-shaped bracket having:
         1. an upper attachment plate with a pair of parallel and abreast elongated upper connection slots formed therethrough, and
         2. an upper leg projection extending from the attachment plate, and
         3. the upper leg projection having a plurality of upper connector apertures formed therethrough and configured to align with the base connector apertures, the upper connector apertures each shaped to receive a connector fastener of the plurality of connector fasteners,
      iii. a lower slotted L-shaped bracket having:
         1. a lower attachment plate with a pair of parallel and abreast elongated lower connection slots formed therethrough, and
         2. a lower leg projection extending from the attachment plate, and
         3. the lower connection slots configured to each align with an upper connection slot when the upper and lower attachment plates are brought into an engagement, to receive a repositionable connection fastener of the plurality of connector fasteners through each aligned set of connection slots to be repositioned within each slot of the aligned set of connection slots and fixed in place to hold the upper and lower slotted L-shaped brackets together at a desired angle, and
         4. the lower leg projection having a plurality of lower connection apertures formed therethrough each shaped to receive a connector fastener of the plurality of connector fasteners, and
      iv. a base bracket including a plurality of spaced-apart base connector apertures therethrough and a plurality of spaced-apart attachment apertures therethrough;
   c. the plurality of connector fasteners, wherein the plurality of connector fasteners includes a pair of angle connection fasteners to be received in the upper and lower connection slots to hold the upper and lower L-shaped brackets together, a plurality of mount connection fasteners to be received through and hold together the mounting plate, the spacer plate, and the leg projection of the upper L-shaped bracket, and a plurality of base connection fasteners to be receive through and hold together the leg projection of the lower L-shaped bracket and the base bracket.

15. The adjustable angle mounting apparatus of claim 14, wherein the plurality of spaced-apart mounting apertures includes a mounting slot shaped to receive a tab of the underwater light assembly.

16. The adjustable angle mounting apparatus of claim 14, wherein the upper slotted L-shaped bracket and the lower slotted L-shaped bracket are each a pair of slotted L-shaped brackets configured to be arranged in parallel pairs of upper and lower slotted L-shaped brackets.

17. The adjustable angle mounting apparatus of claim 14, wherein the base bracket includes a base plate and an adapter ring coupled together.

* * * * *